(12) United States Patent
Kim et al.

(10) Patent No.: US 12,531,311 B2
(45) Date of Patent: Jan. 20, 2026

(54) SEPARATOR FOR ELECTROCHEMICAL DEVICE, ELECTROCHEMICAL DEVICE COMPRISING SEPARATOR AND METHOD FOR PREPARING SEPARATOR

(71) Applicant: LG Energy Solution, Ltd., Seoul (KR)

(72) Inventors: Min-Ji Kim, Daejeon (KR);
Dong-Wook Sung, Daejeon (KR);
So-Mi Jeong, Daejeon (KR)

(73) Assignee: LG ENERGY SOLUTIONS, LTD., Seoul (KR)

( * ) Notice: Subject to any disclaimer, the term of this patent is extended or adjusted under 35 U.S.C. 154(b) by 736 days.

(21) Appl. No.: 17/760,809

(22) PCT Filed: Oct. 16, 2020

(86) PCT No.: PCT/KR2020/014194
§ 371 (c)(1),
(2) Date: Mar. 16, 2022

(87) PCT Pub. No.: WO2021/075925
PCT Pub. Date: Apr. 22, 2021

(65) Prior Publication Data
US 2022/0336924 A1 Oct. 20, 2022

(30) Foreign Application Priority Data

Oct. 18, 2019 (KR) .................. 10-2019-0130072

(51) Int. Cl.
*H01M 50/446* (2021.01)
*H01M 50/403* (2021.01)
(52) U.S. Cl.
CPC ....... *H01M 50/446* (2021.01); *H01M 50/403* (2021.01)

(58) Field of Classification Search
CPC .................................................. H01M 50/446
See application file for complete search history.

(56) References Cited

U.S. PATENT DOCUMENTS

2011/0293976 A1  12/2011  Chiba et al.
2012/0094176 A1* 4/2012  Neumann ......... H01M 10/0525
156/308.2

(Continued)

FOREIGN PATENT DOCUMENTS

CN    1969407 A    5/2007
CN    103296237 A  9/2013

(Continued)

OTHER PUBLICATIONS

Shin et al., "Highly Stretchable Separator Membrane for Deformable Energy-Storage Devices," Advanced Energy Materials, 1801025 (2018).

(Continued)

*Primary Examiner* — Nathanael T Zemui
(74) *Attorney, Agent, or Firm* — Morgan, Lewis & Bockius LLP

(57) ABSTRACT

Disclosed is a separator which essentially includes inorganic particles and a binder resin, can be used as a free standing type separator including no separator substrate, such as a polymer resin film, and causes no problem of heat shrinking. In addition, the separator has increased tensile strength by virtue of the improvement of the crystallinity of the binder resin through elongation, and shows a small dimensional change after being impregnated with an electrolyte.

9 Claims, 1 Drawing Sheet

(56) References Cited

U.S. PATENT DOCUMENTS

| | | | |
|---|---|---|---|
| 2013/0034769 A1* | 2/2013 | Takagi | B32B 5/32 |
| | | | 429/144 |
| 2013/0171499 A1 | 7/2013 | Yang et al. | |
| 2013/0224553 A1 | 8/2013 | Hong et al. | |
| 2015/0340676 A1* | 11/2015 | Schmidhauser | H01M 50/426 |
| | | | 429/131 |
| 2015/0380705 A1 | 12/2015 | Lee et al. | |
| 2016/0268571 A1 | 9/2016 | Honda | |
| 2017/0263905 A1 | 9/2017 | Ogata et al. | |
| 2019/0386274 A1 | 12/2019 | Wood et al. | |
| 2020/0014056 A1 | 1/2020 | Park et al. | |
| 2020/0358065 A1 | 11/2020 | Kim et al. | |
| 2021/0005861 A1* | 1/2021 | Hong | H01M 50/446 |

FOREIGN PATENT DOCUMENTS

| | | |
|---|---|---|
| CN | 105830251 A | 8/2016 |
| CN | 108666512 A | 10/2018 |
| JP | H09-328566 A | 12/1997 |
| JP | 2017-152268 A | 8/2017 |
| KR | 10-1301595 B1 | 8/2013 |
| KR | 10-1430975 B | 8/2014 |
| KR | 10-1611229 B1 | 4/2016 |
| KR | 10-2018-0123527 A | 11/2018 |
| KR | 10-2019-0049581 A | 5/2019 |
| KR | 10-2019-0049604 A | 5/2019 |
| KR | 10-2019-0053121 A | 5/2019 |
| WO | 98/38029 A1 | 9/1998 |
| WO | 98/59384 A1 | 12/1998 |
| WO | 2010/108148 A1 | 9/2010 |
| WO | 2012/018675 A1 | 2/2012 |
| WO | 2019/074925 A1 | 4/2019 |
| WO | 2019/169410 A1 | 9/2019 |

OTHER PUBLICATIONS

International Search Report and Written Opinion (with partial English translation) issued in corresponding International Patent Application No. PCT/KR2020/014194 dated Jan. 29, 2021.

Liu et al., "Effect of Preparation Method on Crystallization Behavior and Tensile Strength of Poly(vinylidene fluoride) Membranes" vol. 3, No. 4, 2013, pp. 390-392.

Extended European Search Report issued in corresponding European Patent Application No. 20877496.8 dated Nov. 22, 2022.

Chinese Office Action issued in corresponding CN Application No. 202080067181.3 dated Apr. 30, 2024.

Chinese Office Action issued in corresponding CN Application No. 202080067181.3 dated Aug. 4, 2023.

Office Action issued in corresponding European Application No. 20877496.8 dated Sep. 5, 2025.

* cited by examiner

SEPARATOR FOR ELECTROCHEMICAL DEVICE, ELECTROCHEMICAL DEVICE COMPRISING SEPARATOR AND METHOD FOR PREPARING SEPARATOR

TECHNICAL FIELD

The present application claims priority to Korean Patent Application No. 10-2019-0130072 filed on Oct. 18, 2019 in the Republic of Korea. The present disclosure relates to a separator for an electrochemical device and an electrochemical device including the same. The present disclosure also relates to a method for manufacturing the separator.

BACKGROUND ART

Recently, securement of safety has been given increasing attentions in the field of electrochemical devices. Particularly, a secondary battery, such as a lithium secondary battery, includes an electrode assembly including a positive electrode, a negative electrode and a separator, and the electrode assembly may be manufactured so that it may have a structure in which the separator is interposed between the positive electrode and the negative electrode. A porous film using a polyolefin-based polymer resin has been used as a separator substrate of such a lithium secondary battery. However, such a porous polymer film is shrunk or molten at high temperature to cause the problem of low heat resistance. To solve the problem, there has been suggested a porous polymer film surface-coated with an inorganic particle coating layer, or a free standing type separator merely including an inorganic material and a binder resin with no polymer separator substrate. When an inorganic material is applied to a separator as mentioned above, heat shrinking properties and safety may be improved. However, the resultant separator may undergo an increase in thickness and a dimensional change in width and length due to its volumetric swelling, resulting in defects in the appearance of a battery. In addition, the separator is spaced apart from an electrode to generate air bubbles in the battery, interfacial resistance between the electrode and the separator is increased, and lithium may be deposited in the gap between the electrode and the separator, resulting in the problem of an increase in cell resistance. Therefore, there is a need for reducing a dimensional change in a free standing type separator. In addition, there is a need for increasing the tensile strength of a separator to ensure the processability during the assemblage of a battery, when such a free standing type separator is applied to the manufacture of a battery.

DISCLOSURE

Technical Problem

The present disclosure is designed to solve the problems of the related art, and therefore the present disclosure is directed to providing a free standing type separator including a binder resin and inorganic particles. Particularly, the present disclosure is directed to providing a separator, which has improved tensile strength by virtue of the improvement of crystallinity of a binder resin through elongation and shows a small dimensional change after being impregnated with an electrolyte. The present disclosure is also directed to providing a method for manufacturing a separator having the above-mentioned structural characteristics. In addition, the present disclosure is directed to providing an electrochemical device including a positive electrode, a negative electrode, a separator interposed between the positive electrode and the negative electrode, and an electrolyte, wherein the separator is the above-described separator. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to the first embodiment of the present disclosure, there is provided a separator including an insulating porous layer, wherein the insulating porous layer includes inorganic particles and a binder resin, the inorganic particles are present in an amount of 70-90 wt % based on 100 wt % of the insulating porous layer, the binder resin includes polyvinylidene fluoride homopolymer in an amount of 50 wt % or more based on 100 wt % of the binder resin, and the binder resin has a crystallinity of 50% or more.

According to the second embodiment of the present disclosure, there is provided the separator as defined in the first embodiment, wherein the inorganic particles in the insulating porous layer are bound to one another by means of the binder resin, and the insulating porous layer has porous properties of pores derived from the interstitial volumes among the inorganic particles.

According to the third embodiment of the present disclosure, there is provided the separator as defined in the first or the second embodiment, wherein the inorganic particle includes at least one selected from the group consisting of $Al_2O_3$, AlOOH, $Al(OH)_3$, AlN, BN, MgO, $Mg(OH)_2$, $SiO_2$, ZnO, $TiO_2$ and $BaTiO_3$.

According to the fourth embodiment of the present disclosure, there is provided the separator as defined in any one of the first to the third embodiments, wherein the inorganic particles have an average particle diameter of 0.001-3 μm.

According to the fifth embodiment of the present disclosure, there is provided the separator as defined in any one of the first to the fourth embodiments, wherein the polyvinylidene fluoride homopolymer has a molecular weight (Mw) of 600,000-2,000,000 g/mol.

According to the sixth embodiment of the present disclosure, there is provided the separator as defined in any one of the first to the fifth embodiments, which includes the insulating porous layer(s) alone.

According to the seventh embodiment of the present disclosure, there is provided a method for manufacturing the separator as defined in any one of the first to the sixth embodiments, which includes a step of elongating the insulating porous layer in at least one direction.

According to the eighth embodiment of the present disclosure, there is provided the method as defined in the seventh embodiment, wherein the insulating porous layer has a rectangular planar shape having a ratio of width to length of larger than 1, and the method includes a step of elongating the insulating porous layer in the transverse direction, longitudinal direction or both directions.

According to the ninth embodiment of the present disclosure, there is provided the method as defined in the seventh or the eighth embodiment, wherein the step of elongating the insulating porous layer is carried out under warming.

According to the tenth embodiment of the present disclosure, there is provided the method as defined in the ninth embodiment, wherein the step of elongating the insulating porous layer is carried out at a temperature ranging from the glass transition temperature of the binder resin to the melting point of the binder resin.

Advantageous Effects

The separator according to the present disclosure essentially includes inorganic particles and a binder resin, can be used as a free standing type separator including no separator substrate, such as a polymer resin film, and causes no problem of heat shrinking. In addition, the separator according to an embodiment of the present disclosure has increased tensile strength by virtue of the improvement of the crystallinity of the binder resin through elongation, and shows a small dimensional change after being impregnated with an electrolyte.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
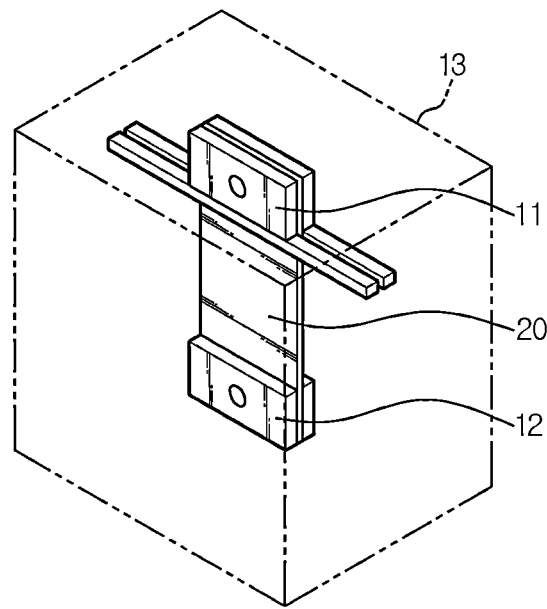
FIG. 1 is a schematic view illustrating a step of elongating the insulating porous layer according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The terms used in the specification are for illustrative purposes only and are directed to describing exemplary embodiments, but the scope of the present disclosure is not limited thereto. As used herein, the singular forms "a", "an" and "the" are intended to include the plural forms as well, unless the context clearly indicates otherwise.

In addition, it will be understood that the terms "includes", "has", or "comprises" when used in this specification, refer to the presence of any stated shapes, numbers, steps, operations, members, elements and/or groups thereof, but do not preclude the addition of one or more other shapes, numbers, steps, operations, members, elements and/or groups thereof.

In one aspect of the present disclosure, there is provided an insulating porous layer. The insulating porous layer may be used as a separator for an electrochemical device. Herein, a typical example of the electrochemical device may be a rechargeable secondary battery including a unit cell formed by stacking a positive electrode, a separator and a negative electrode, successively.

In another aspect of the present disclosure, there is provided a separator for an electrochemical device including the insulating porous layer, particularly, a free standing type separator including the insulating porous layer alone. According to the present disclosure, the free standing type separator is a separator including the insulating porous layer(s) alone, and not including any other element (e.g. separator substrate, such as a polymer resin film) than the insulating porous layer according to the present disclosure.

According to an embodiment of the present disclosure, the insulating porous layer is an organic/inorganic composite film including inorganic particles and a binder resin. In the insulating porous layer, the inorganic particles are bound to one another by the binder resin so that they may be packed in a layered structure. According to the present disclosure, the organic/inorganic composite film has porous characteristics derived from the pores formed by the interstitial volumes among the inorganic particles. The interstitial volumes mean spaces defined by the inorganic particles facing one another substantially in a packed structure of the inorganic particles. The pores are interconnected with one another so that gases or liquids may pass through a substrate from one surface of the substrate to the other surface thereof.

According to an embodiment of the present disclosure, there is no particular limitation in the inorganic particles, as long as they are electrochemically stable and have a particle size compatible with the thickness of the insulating porous layer. In other words, there is no particular limitation in the inorganic particles used according to the present disclosure, as long as they cause no oxidation and/or reduction in the range (e.g. 0-5 V based on $Li/Li^+$) of operating voltage of an applicable battery. For example, the inorganic particles may have a particle diameter of 0.001-3 μm, or 0.001-2 μm. When the inorganic particles have a size of less than 0.001 μm, dispersibility may be degraded. When the inorganic particles have a size of larger than 3 μm, it is difficult to provide the resultant insulating porous layer in the form of a thin film. Therefore, when the insulating porous layer is applied alone to a separator, the separator shows an excessively large pore size to cause degradation of insulation properties. Considering the above, the inorganic particles may be controlled to have a particle diameter of about 20-500 nm.

Non-limiting examples of the inorganic particles include $Al_2O_3$, AlOOH, $Al(OH)_3$, AlN, BN, MgO, $Mg(OH)_2$, $SiO_2$, ZnO, $TiO_2$, $BaTiO_3$ or a mixture thereof.

In addition, the binder resin is not particularly limited, as long as it provides the inorganic particles with binding force and imparts the binding force between the insulating porous layer and the electrodes. The insulating porous layer may include the inorganic particles in an amount of 70-90 wt % based on 100 wt % of the insulating porous layer. When the content of the inorganic particles is excessively high, the content of the binder resin is reduced, and thus the inorganic particles may be detached easily from the insulating porous layer and the insulating porous layer may show low durability, including easy brittleness. On the contrary, when the content of the inorganic particles is excessively low, the proportion of the binder resin is increased and the insulating porous layer shows low porosity, resulting in degradation of resistance characteristics.

The insulating porous layer is not particularly in its thickness. For example, the insulating porous layer may have a thickness of 0.01-50 μm.

In addition, the insulating porous layer is not particularly limited in its pore size and porosity. Preferably, the insulating porous layer may have a pore size of 0.001-3 µm, or 0.001-2 µm, and a porosity of 10-90 vol %. The pore size and porosity largely depend on the size of inorganic particles, but may be affected by the type of a binder resin. For example, when using inorganic particles having a particle diameter of 1 µm or less, the pore size may be approximately 1 µm or less. Such a pore structure is filled with the subsequently injected electrolyte, and the electrolyte functions to conduct ions. When the pore size and porosity are less than 0.001 µm and less than 10 vol %, respectively, the resultant insulating porous layer may function as a resistance layer. When the pore size and porosity are more than 10 µm and more than 90 vol %, respectively, the resultant insulating porous layer may show degraded mechanical properties.

In addition, the method for determining the porosity and pore size is not particularly limited, and may be generally determined by using Brunauer-Emmett-Teller method using an adsorption gas, such as nitrogen, to measure the micropore volume and mesopore volume, or by using the conventionally used mercury (Hg) intrusion porosimetry. Further, the porosity may be calculated from the apparent density of the insulating porous layer and the true density of the ingredients forming the insulating porous layer.

According to an embodiment of the present disclosure, the insulating porous layer may be obtained by preparing a composition for forming an insulating porous layer including inorganic particles and a binder resin, and forming the composition into a sheet-like film.

First, the composition for forming an insulating porous layer may be obtained by preparing a polymer solution including a binder resin dissolved in a solvent and a dispersion including inorganic particles dispersed in a solvent, individually, and mixing the polymer solution with the dispersion. The inorganic particles may be added, after they are pulverized to a predetermined average particle diameter. Otherwise, the inorganic particles are added to a solvent, and then dispersed in the solvent, while being controlled to have a predetermined particle diameter by using a ball milling process, or the like, thereby providing a dispersion. Meanwhile, according to an embodiment of the present disclosure, the solid content in the polymer solution, except the solvent, may be controlled to 10 wt % or less, such as 5-7 wt %. When the solid content is larger than 10 wt %, the binder resin may not be dissolved in the solvent sufficiently. Therefore, the solid content is controlled preferably to 10 wt % or less. In addition, it is preferred to control the solid content in the dispersion, except the solvent, to 30-70 wt %.

The polymer solution may be mixed with the dispersion by using a mixing device, such as a homodiper. For example, when the composition is prepared by using a homodiper, mixing may be carried out at about 2000 rpm for about 30 minutes.

Then, the composition is applied to a release sheet and dried to form an insulating porous layer. The composition may be applied through a coating method selected suitably from the known coating methods, including a dip coating process, a slot die coating process, a microgravure coating process, a wire coating process and a doctor blade coating process. Particularly, it is preferred to use a slot die coating or dip coating process. A slot die coating process includes coating a composition supplied through a slot die onto the whole surface of a release sheet and is capable of controlling the thickness of a coated composition depending on the flux supplied from a metering pump. In addition, dip coating includes dipping a release sheet into a tank containing a composition to carry out coating and is capable of controlling the thickness of a coated composition depending on the concentration of the composition and the rate of removing the release sheet from the composition tank.

Meanwhile, the release sheet is not particularly limited, as long as it does not damage the resultant insulating porous layer upon removal. For example, the release sheet may include a glass plate or a polymer film made of polyethylene terephthalate.

The solvent used for the composition preferably has a solubility parameter similar to the solubility of the binder resin to be used and a low boiling point to facilitate removal of the organic solvent during a drying process. This is because such a solvent facilitates homogeneous mixing and the subsequent removal. Considering the above, the solvent preferably has a boiling point of 80-180° C., or 100-165° C. Non-limiting examples of the solvent include acetone, tetrahydrofuran, methylene chloride, chloroform, dimethyl formamide, N-methyl-2-pyrrolidone (NMP), cyclohexane, mesitylene, dimethyl acetamide, dimethyl sulfone, dimethyl carbonate, methyl ethyl ketone, methyl acetate, cyclohexanone, or the like. The above solvents may be used alone or in combination. Preferably, the solvent may include any one selected from N-methyl-2-pyrrolidone (NMP), cyclohexane, mesitylene, dimethyl acetamide, dimethyl sulfone and dimethyl carbonate, or a mixture of two or more of them.

According to the present disclosure, the binder resin used for the insulating porous layer may include any one selected from the group consisting of a polyvinylidene fluoride (PVdF)-based resin, styrene-butadiene rubber (SBR), polytetrafluoroethylene (PTFE), polyethylene glycol (PEG), polypropylene glycol (PPG), toluene diisocyanate (TDI), polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyimide, or a mixture of two or more of them.

Particular examples of the polyvinylidene fluoride-based binder resin may include any one selected from the group consisting of polyvinylidene fluoride homopolymer, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylene, or a mixture of two or more of them.

According to the present disclosure, the binder resin may include a polyvinylidene fluoride (PVdF)-based polymer, preferably polyvinylidene fluoride (PVdF) homopolymer containing vinylidene fluoride as monomers. According to an embodiment of the present disclosure, the binder resin includes polyvinylidene fluoride (PVdF) homopolymer in an amount of 50 wt % or more, preferably 75 wt % or more, and more preferably 90 wt % or more, based on 100 wt % of the binder resin.

Meanwhile, the polyvinylidene fluoride (PVdF) homopolymer preferably has a molecular weight (Mw) of 600,000-2,000,000 g/mol. When the molecular weight is less than the above-defined range, a separator including the insulating porous layer alone shows low mechanical strength and degraded durability. On the other hand, when the molecular weight is excessively larger than the above-defined range, the binder resin shows low solubility and degraded processability during the preparation of a polymer solution. For example, the molecular weight may be determined by using gel permeation chromatography (GPC), such as PL GPC220 available from Agilent Technologies.

Then, the coated composition is dried to remove the solvent and a sheet-like insulating porous layer is obtained. The composition may be dried naturally or under heating. The heating may be generally carried out through a heating process, such as a heater, an oven, a resistance heating, an electrical induction heating, a hot air heating, an infrared ray heating, or the like. The release sheet may function not only as a support on which the slurry is coated but also as a means for drying the slurry and removing the organic solvent. Therefore, the heating may be carried out by heating the release sheet, after providing the release sheet with a heating means. The heating may be carried out at a temperature of about 40-200° C., preferably about 60-180° C. In addition, the heating time is not particularly limited, but may be about 10 minutes to 2 hours. After the composition is dried completely, the release sheet is removed to obtain an insulating porous layer.

After that, the resultant member for an insulating porous layer is elongated to form an insulating porous layer. The elongation may be carried out in any one specific direction or more.

The elongation may be carried out by using a means capable of applying physical force by which the insulating porous layer may be elongated in a desired direction, and is not limited to any specific method. FIG. 1 is a schematic view illustrating the step of elongating the insulating porous layer according to an embodiment of the present disclosure. Herein, the insulating porous layer 20 is allowed to stand in the longitudinal direction (gravity direction), the top portion thereof is fixed with a first jig 11, and a weight (second jig) is suspended from the bottom portion thereof so that the insulating porous layer may be elongated in the longitudinal direction (gravity direction). For example, the elongation may be carried out under heating in an oven 13, and the first jig may be linked to the top of the oven. In a variant, the insulating porous layer may be laid in the direction (horizontal direction) perpendicular to the gravity direction, a first jig and a second jig are linked to one end and the other end of the insulating layer, respectively, and then the insulating layer may be elongated by drawing it in the opposite directions.

Figure 2:
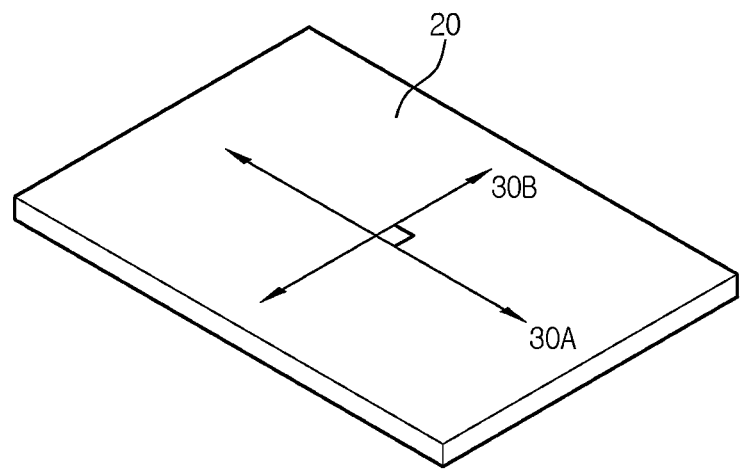
FIG. 2 is a schematic view illustrating the insulating porous layer elongated in two directions perpendicular to each other.

According to an embodiment of the present disclosure, the insulating porous layer may be elongated in the first direction and the second direction, wherein the first direction and the second direction may be perpendicular to each other. For example, when the insulating porous layer has a rectangular planar shape with a ratio of width to length of larger than 1, the elongation may be carried out in the transverse direction or the longitudinal direction, or both. When the elongation is carried out in at least two directions, elongation in each direction may be carried out sequentially or simultaneously. FIG. 2 is a schematic view illustrating the insulating porous layer 20 elongated in the first direction 30A and the second direction 30B, wherein the first direction and the second direction are perpendicular to each other.

The binder is provided with an increased orientation degree and crystallinity through the elongation step. Therefore, the insulating porous layer has improved physical strength and shows a small dimensional change, even after being impregnated with an electrolyte.

According to an embodiment of the present disclosure, the binder preferably shows a crystallinity of 50% or more, as determined by the crystallinity band gap intensity of the infrared ray absorption spectrum. As used herein, the crystallinity refers to the weight fraction of a crystalline portion based on the total polymer resin. The crystallinity may be determined by a method (density method, clean needle technique) of assuming an increase/decrease from two density values of a crystalline portion and a non-crystalline portion, a method for determining crystallinity from heat of fusion, a method (X-ray method) for determining crystallinity by separating the intensity distribution in X-ray diffractometry into the diffraction derived from a non-crystalline portion and the diffraction derived from a crystalline portion, a method for determining crystallinity from the crystallinity band gap intensity of the infrared ray absorption spectrum, or the like. Particularly, the method for determining crystallinity from the crystallinity band gap intensity of the infrared ray absorption spectrum may be used.

Meanwhile, according to the present disclosure, the elongation may be carried out preferably with an elongation ratio of 10% or less. As used herein, the elongation ratio means a ratio (%) of an increase in length based on the initial length.

Meanwhile, the elongation may be carried out under warming of the insulating porous layer. According to an embodiment of the present disclosure, the elongation is preferably carried out at a temperature ranging from the glass transition temperature of the binder resin to the melting point of the binder resin. When the elongation is carried out at a temperature lower than the glass transition temperature, the insulating porous layer cannot be elongated. When the elongation is carried out at a temperature higher than the melting point, the binder resin may be molten, and the insulating porous layer may be broken during the elongation.

The insulating porous layer according to the present disclosure, as it is, may be used as a separator (free standing type separator) for an electrochemical device. In a variant, the insulating porous layer may be laminated with another separator material having different characteristics to provide a separator.

In another aspect, there is provided a secondary battery including the separator according to the present disclosure. The secondary battery includes a positive electrode, a negative electrode and a separator interposed between the positive electrode and the negative electrode, wherein the separator may consist of the above-described insulating porous layer according to an embodiment of the present disclosure. In a variant, the separator may be a composite separator including the insulating porous layer.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

According to the present disclosure, the positive electrode includes a positive electrode current collector, and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{1-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0<x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Insulating Porous Layer Member

PVdF (Tm 164° C., Tg −40° C., Mw 1,400,000 g/mol) was dissolved in NMP to prepare a polymer solution having a solid content of 5 wt %. In addition, AlOOH ($D_{50}$ 40 nm) was introduced to NMP and dispersed therein by using a ball mill to prepare a dispersion (solid content 50 wt %). The ball milling was carried out with a bead size of 0.5 cm for 3 hours. Then, the polymer solution was mixed with the dispersion by using a homodiper to prepare a composition for an insulating porous layer. The mixing was carried out at a rate of about 2000 rpm for about 30 minutes. The content of the binder resin in the insulating porous layer was about 20% based on 100% of the total weight of the binder resin and the inorganic particles. The resultant composition was applied to a glass plate by using a bar coater device to a thickness of 350 μm.

The glass plate coated with the composition was introduced to a convection oven and dried at 150° C. for 30 minutes, and then the glass plate was removed to obtain an insulating porous layer member. The resultant insulating porous layer member was cut into a size of 8 cm×10 cm (width×length).

(2) Elongation of Insulating Porous Layer Member and Preparation of Insulation Porous Layer Then, the insulating porous layer member was elongated under warming. One end of the insulating porous layer member was held by the first jig fixed to the top end of the oven, and the second jig having a weight of about 466 g was held to the other end of the insulating porous layer member, and then tensile force was applied in the gravity direction. The elongation was carried out in a convection oven at 160° C. for about 10 minutes. In this manner, the insulating porous layer member was elongated to obtain an insulating porous layer. In the same manner, two sheets of insulating porous layer specimens were prepared, and one of the sheets is designated as Example 1-1 and the other of the sheets is designated as Example 1-2.

Example 2

An insulating porous layer specimen was prepared in the same manner as Example 1, except that PVdF (Tm 160° C., Tg −40° C., Mw 1,400,000 g/mol) was used.

Example 3

An insulating porous layer specimen was prepared in the same manner as Example 1, except that PVdF (Tm 150° C., Tg −40° C., Mw 600,000 g/mol) was used.

Comparative Example 1

An insulating porous layer was prepared merely by carrying out item (1) in Example 1 with no elongation step of item (2) in Example 1. In the same manner, two sheets of insulating porous layer specimens were prepared, and one of the sheets is designated as Comparative Example 1-1 and the other of the sheets is designated as Comparative Example 1-2.

Comparative Example 2

An insulating porous layer was prepared merely by carrying out item (1) with no elongation step of item (2) in Example 2.

Comparative Example 3

An insulating porous layer was prepared merely by carrying out item (1) with no elongation step of item (2) in Example 3.

Calculation of Elongation

An elongation refers to a ratio (%) of an increase in length of a separator after elongation based on the initial length of the separator, and may be represented by the following formula.

Elongation (%)={(Length of elongated separator after elongation−Initial length of separator)/Initial length of separator}×100

Determination of Crystallinity

A crystallinity was determined by using a nuclear magnetic resonance (NMR) spectrometry instrument (Agilent 600 NMR equipped with a 1.6 mm magic angle spinning (MAS) probe) under the test condition of a single pulse experiment with d1=30 s, ns varied from 64 to 1744 and a MAS frequency of 35 kHz. According to the following Table 1, Examples 1 and 2 show a crystallinity of 50% or more, while Comparative Examples 1 and 2 show a low crystallinity of less than 50%.

Determination of Tensile Strength

Each of the insulating porous layers according to Examples and Comparative Examples was cut into a size of 15 mm×150 mm to prepare a specimen. Each insulating porous layer specimen was attached to slide glass in such a manner that it may correspond to the short axis direction and the long axis direction of the slide glass. One end of the insulating porous layer positioned on slide glass and the other end of the insulating porous layer not adhered to slide glass were mounted to a universal testing machine (UTM), and then both ends were drawn in the opposite directions to measure the strength at break. Herein, UTM was operated at a rate of 500 mm/min and the length of the determination unit was 100 mm. The results are shown in the following Table 1.

Determination of Dimensional Change

Each of the insulating porous layers according to Examples and Comparative Examples was cut into a size of 15 cm×15 cm to prepare a specimen. Ethylene carbonate/ethyl methyl carbonate/dimethyl carbonate were mixed at a volume ratio of 3:3:4, and 1.0 M $LiPF_6$ as a lithium salt was added thereto to prepare an electrolyte. Each insulating porous layer specimen was impregnated with 10 mL of the electrolyte for 1 hour, and then a change in width and length of each insulating porous layer was measured to calculate a dimensional change. The results are shown as average values. Referring to Table 1 and Table 2, Comparative Example 1 shows an increase in length of 1.8 times as compared to Example 1, and Comparative Example 2 shows an increase in length of about 1.5 times as compared to Example 2.

Determination of Resistance

Each of the insulating porous layer specimens according to Examples and Comparative Examples was determined in terms of resistance as follows. $LiPF_6$ was dissolved in a mixed solvent containing ethylene carbonate, propylene carbonate and propyl propionate at a volume ratio of 25:10:65 to a concentration of 1 M to prepare an electrolyte. Each insulating porous layer specimen was impregnated with the electrolyte and the electrical resistance was measured by using Multi-probe analyzer (Hioki Co.). It can be seen from the following Table 1 that the insulating porous layer specimens according to Examples show lower resistance as compared to the insulating porous layer specimen according to Comparative Examples.

TABLE 1

|  | Ex. 1-1 | Ex. 1-2 | Ex. 2 | Ex. 3 |
|---|---|---|---|---|
| Elongation (%) | 8 | 2 | 8 | 8 |
| Thickness (μm) | 15.2 | 15.3 | 15.5 | 15.3 |
| Gurley (sec/100 cc) | 119 | 326 | 150 | 165 |
| Electrical resistance (Ω) | 0.55 | 0.92 | 0.62 | 0.69 |
| Crystallinity (%) | 60 | 62 | 58 | 54 |
| Tensile strength (Kgf/cm$^2$) | 147 | 165 | 162 | 135 |
| Dimensional change (%) | 1.0 | 1.0 | 1.2 | 1.1 |

TABLE 2

|  | Comp. Ex. 1-1 | Comp. Ex. 1-2 | Comp. Ex. 2 | Comp. Ex. 3 |
|---|---|---|---|---|
| Elongation (%) | — | — | — | — |
| Thickness (μm) | 15.7 | 14.4 | 16.2 | 15.8 |
| Gurley (sec/100 cc) | 162 | 333 | 192 | 200 |
| Electrical resistance (Ω) | 0.55 | 0.95 | 0.75 | 0.83 |
| Crystallinity (%) | 39 | 46 | 52 | 48 |
| Tensile strength (Kgf/cm$^2$) | 121 | 164 | 140 | 110 |
| Dimensional change (%) | 1.8 | 1.5 | 2.0 | 2.0 |

What is claimed is:
1. A free standing separator for an electrochemical device consisting of an insulating porous layer, wherein the insulating porous layer comprises inorganic particles and a binder resin,
the insulating porous layer comprises the inorganic particles in an amount of 70-90 wt % based on 100 wt % of the insulating porous layer,
the binder resin comprises polyvinylidene fluoride homopolymer in an amount of 70 wt % or more based on 100 wt % of the binder resin, and
the binder resin has a crystallinity of 62% or more.

2. The free standing separator for an electrochemical device according to claim 1,
wherein the inorganic particles are bound to each other with the binder resin, and
the insulating porous layer has pores derived from the interstitial volumes among the inorganic particles.

3. The free standing separator for an electrochemical device according to claim 1, wherein the inorganic particle comprises at least one selected from the group consisting of $Al_2O_3$, AlOOH, $Al(OH)_3$, AlN, BN, MgO, $Mg(OH)_2$, $SiO_2$, ZnO, $TiO_2$ and $BaTiO_3$.

4. The free standing separator for an electrochemical device according to claim 1, wherein the inorganic particles have an average particle diameter of 0.001-3 μm.

5. The free standing separator for an electrochemical device according to claim 1, wherein the polyvinylidene fluoride homopolymer has a molecular weight (Mw) of 600,000-2,000,000 g/mol.

6. A method for manufacturing the free standing separator according to claim 1, comprising elongating the insulating porous layer in at least one direction.

7. The method according to claim 6, wherein the insulating porous layer has a rectangular planar shape having a ratio of width to length of larger than 1, and the at least one direction comprises a transverse direction, a longitudinal direction or both directions.

8. The method according to claim 6, wherein the elongating the insulating porous layer is carried out under warming.

9. The method according to claim 8, wherein the elongating the insulating porous layer is carried out at a temperature ranging from the glass transition temperature of the binder resin to a melting point of the binder resin.

* * * * *